(12) United States Patent
Beyer et al.

(10) Patent No.: US 6,546,402 B1
(45) Date of Patent: Apr. 8, 2003

(54) SYSTEM AND METHOD FOR ASYNCHRONOUS VIEW MAINTENANCE (75) Inventors: Kevin Scott Beyer, Madison, WI (US); Roberta Jo Cochrane, Los Gatos, CA (US); Bruce Gilbert Lindsay, San Jose, CA (US); Kenneth Mark Salem, Waterloo (CA)

(73) Assignee: International Business Machines Corporation, Armonk, NY (US)

( * ) Notice: Subject to any disclaimer, the term of this patent is extended or adjusted under 35 U.S.C. 154(b) by 359 days.

(21) Appl. No.: 09/586,809

(22) Filed: Jun. 5, 2000

(51) Int. Cl.$^7$ ............................................... G06F 17/30
(52) U.S. Cl. ................................................... 707/201
(58) Field of Search .............................. 707/1, 3, 5, 8, 707/10, 102, 203

(56) References Cited

U.S. PATENT DOCUMENTS 6,026,390 A * 2/2000 Ross et al. ..................... 707/1
6,125,360 A * 9/2000 Witkowski et al. ........ 707/102
6,134,543 A * 10/2000 Witkowski et al. ........... 707/2
6,334,128 B1 * 12/2001 Norcott et al. ................ 707/10
6,353,835 B1 * 3/2002 Lieuwen ...................... 707/203

OTHER PUBLICATIONS

Abraham Silberschatz et al., Database System Concepts, 1999, McGrawHill, 3$^{rd}$ edition, pp. 72–73 and 82.*

* cited by examiner

*Primary Examiner*—Diane D. Mizrahi
*Assistant Examiner*—Apu Mofiz
(74) *Attorney, Agent, or Firm*—John L. Rogitz (57) ABSTRACT

A method and system for refreshing materialized join views includes asynchronously evaluating changes to the base tables, i.e., evaluating changes for an intended time $t_{intended}$ at an evaluation time $t_{eval}$ that is later than the intended time. Changes made to the base table between the intended time $t_{intended}$ and evaluation time $t_{eval}$ are recursively compensated for. The results of the evaluating and compensating are then applied to the materialized view to refresh the view.

30 Claims, 3 Drawing Sheets

FIG. 3
OVERALL FLOW

FIG. 4
PROPAGATION

FIG. 5
COMPENSATION
SUBROUTINE

FIG. 6
RECURSIVE COMPENSATION

SYSTEM AND METHOD FOR ASYNCHRONOUS VIEW MAINTENANCE

BACKGROUND OF THE INVENTION

1. Field of the Invention

The present invention relates generally to relational database systems, and more particularly to systems and methods for rdbms view maintenance.

2. Description of the Related Art

Relational database systems store large amounts of data in table format, including business data that can be analyzed to support business decisions. For example, a relational database system can be used to store sales data including information on sales by time period, product, product line, geographic area, and so on, which can be usefully presented in response to a query to support a particular business decision. It will readily be appreciated that data can be presented in numerous ways to support a decision depending on the particular decision (and, hence, query) being made.

To respond to a user query, relational database systems often undertake table joins, i.e., operations that relate data in two or more tables. In a relational database, a "view" is a relation that is derived from other relations, and views can be queried, with new views being derived thereby. A view may be "materialized" by storing the view's tuples (data) in the database, to thereby promote more efficient querying, since a view's tuples need not be re-derived for every query involving the view.

As recognized herein, a materialized view can become stale unless it is refreshed, i.e., updated, as the underlying tables are changed (by, e.g., deleting a record or adding a record). Executing queries on stale views can result in out of date query results. Completely recomputing a view, however, can take considerable time away from other processes that use the RDBMS, such that it is often desirable to incrementally update a materialized view.

The present invention recognizes several problems with current incremental view update methods. First, they are atomic, meaning that the transaction updating the view must have available a consistent snapshot of the underlying tables. If the view involves table joins as is often the case, the update transaction must join several combinations of base table and "delta" tables, i.e., tables that record recent changes to the base tables. This results in a long-lived update transaction, in turn resulting in contention between the view update process and concurrent updates of the underlying tables of the view. This drawback looms larger in e-commerce applications, wherein databases can be continuously accessed around the clock.

Second, incremental update transactions heretofore were synchronous with the update interval. In other words, the view updates had to be calculated at a specific time, because the base tables as they exist at the update time have been required. Thus, it is not possible to decide, say, at 8 P.M. to refresh a materialized view from its 4 P.M. state to its 5 P.M. state, because at 8 P.M. data in the underlying tables may have been changed since 5 P.M. Consequently, the decision to refresh the view must be made at 5 P.M. under these hypothetical circumstances, and the full costs of the update must be paid then even though more resources might be available later on when the computing load is lighter.

Simply refreshing the view using very small refresh intervals, e.g., within every transaction can address some of the above-noted problems but is attended with its own. For instance, updates at very small intervals forces the materialized view to track real time very closely, which can be impractical or even undesirable for some applications, e.g., when the materialized view represents daily sales results.

Moreover, the use of short refresh intervals does not address the synchronization problem noted above. Breaking the process up into two components—propagation phase, wherein the view update is evaluated, and apply phase, wherein the update is applied to the view—only partially addresses the synchronization problem, since the apply phase may be undertaken asynchronously but the propagation phase must still be executed synchronously at the target time of the view refresh absent the inventive features set forth herein. In any case, the present invention recognizes the above-noted problems and provides the solutions disclosed herein.

SUMMARY OF THE INVENTION

A general purpose computer is programmed according to the inventive steps herein to undertake updates of materialized database views, regardless of whether the updates are required because of select-project-join views, or views involving unions. The invention can also be embodied as an article of manufacture—a machine component—that is used by a digital processing apparatus and which tangibly embodies a program of instructions that are executable by the digital processing apparatus to execute the present logic. This invention is realized in a critical machine component that causes a digital processing apparatus to perform the inventive method steps herein.

The invention can be implemented by a computer system including a general purpose computer that executes method acts to refresh a view table. These method acts include deriving changes to at least one base table accessible to the computer to render at least one delta table, with the base table being combinable with other tables to render the view table. Also, the method includes associating at least one record timestamp with at least one record in at least one delta table and combining at least one delta table with at least one base table of the join view to render a combination table. Then, the method contemplates computing at least one combination timestamp representing the combining act. Using the combination timestamp, at least one compensation table to the combination table is computed. At least one compensation table is then combined with at least one combination table to render a view delta table useful for refreshing the materialized view table.

In a preferred embodiment, the view table is materialized, and the view delta table accounts for transactions from the time of the current view materialization to a time $t_{target}$. The rendering of the view delta table is undertaken at a time $t_{eval}$ that is later than $t_{target}$, such that the view delta table is rendered asynchronously with respect to $t_{target}$. The evaluation time $t_{eval}$ can be dynamically established during each repetition of the logic, such that changes to the view are propagated using a series of transactions the sizes of which are established by the selection of the ranges of timestamps of delta table rows for each repetition. Tuples in the view delta table are timestamped, such that the changes that are timestamped after the time of the current view materialization and before a time $t_{highwater}$ are valid to apply to the materialized view. The act of deriving changes to at least one base table to render at least one delta table accounts for transactions from a time $t_\delta$ prior to at least the time $t_{target}$. Moreover, tuples in each combination table and compensation table are associated with counts, and the count of each tuple is the product of the counts of the tuples from which it was derived, whereas the timestamp of each tuple is the minimum of the timestamps of the tuples from which it was derived. Accordingly, the combination tables and compensation tables in the view delta table have count columns and timestamp columns. When an even number of delta tables are involved in the computation of a compensation table, the counts of the tuples of the compensation table are negated before combining the compensation table with the view delta table.

If desired, the view table can be associated with at least three base tables, and the computer derives changes to the three base tables by accounting for transactions to three respective times $t_{new}^1$, $t_{new}^2$, and $t_{new}^3$, that can be different from each other. Under these circumstances, compensation is undertaken recursively.

In another aspect, a computer-implemented method is disclosed for refreshing a materialized view. The method includes evaluating changes for an intended time $t_{intended}$ to at least one base table associated with the view at an evaluation time $t_{eval}$ that is later than the intended time. The method also includes recursively compensating for changes made to base tables between the intended time $t_{intended}$ and evaluation time $t_{eval}$, and then applying the results of the evaluation and compensation to the materialized view to refresh the view.

In still another aspect, a computer program device includes a computer program storage device that is readable by a digital processing apparatus. A program is on the program storage device and it includes instructions that can be executed by the digital processing apparatus to incrementally compute changes to a materialized join view which refect changes to base tables. The program includes computer readable code means for recording updates to a plurality of base tables as they occur. Computer readable code means, at subsequent times, extract the updates that occurred to selected base tables over given time intervals. Also, computer readable code means are provided for combining extracted updates with the base tables in multiple steps to compute changes to the materialized join view.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
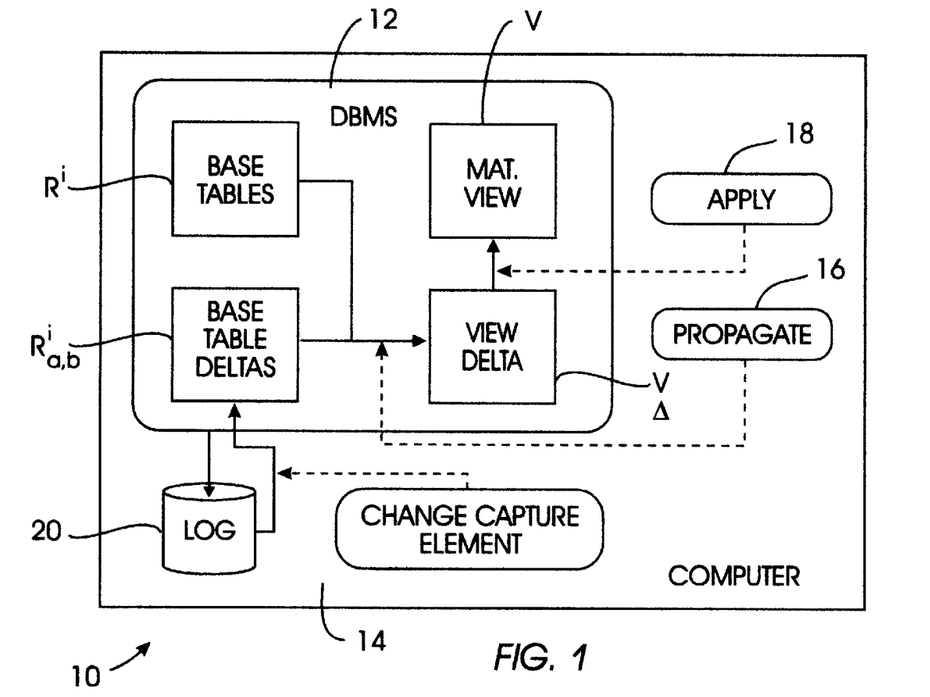
FIG. 1 is a schematic diagram showing the architecture of the present invention, with solid lines representing data flow and dashed lines representing which software module controls the indicated flow.

Referring initially to FIG. 1, a system is shown, generally designated 10, for updating, i.e. refreshing, materialized views in a relational database management system (RDBMS) 12, such as a relational database system made by the present assignee. The data may reside, for example, in one or more base tables $R^i$ and one or more "delta" tables $R^i_{a,b}$ that contain changes to the respective base tables $R^i$ between the times "a" and "b", with the notation $R^i$ denoting the state of a table "$R^i$" at the current time, i.e., including the effects of all transactions up to but not beyond the current time.

A delta table $R^i_{a,b}$ (also referred to as a "base table delta") of a base table $R^i$ has the same attributes as the base table plus two, namely, a count attribute of −n or +n, representing whether "n" such tuples have been deleted or inserted, respectively, and a timestamp for each tuple, representing the time of the insertion or deletion of the tuple. An update to an existing tuple is considered as a deletion followed by an insertion. For purposes of the present invention base tables are considered to implicitly have count attributes of +1 for every tuple in the table and null timestamps. Because the tuples in delta tables are timestamped, an operation $\sigma_{a,b}$ can be defined that selects all tuples in a delta table that have timestamps from time $t_a$ up to and including time $t_b$.

In the particular architecture shown, the system 10 includes a digital processing apparatus, It such as a computer 14. In one intended embodiment, the computer 14 may be an RDBMS computer made by International Business Machines Corporation (IBM) of Armonk, N.Y., or the computer 14 may be any computer, including computers sold under trademarks such as AS400, with accompanying IBM Network Stations. Or, the computer 14 may be an IBM laptop computer or personal computer, In any case, the RDBMS 12 is of the compiling kind, and it executes in the computer 14 receiving, among other things, user requests that contain database queries. The DBMS 12 processes the queries, providing access to the data tables therein.

In but one illustrative use of the present invention, the user might want to retrieve information from the RDBMS 12 by generating a query that is executed in the context of an application program containing database queries. Prior to execution of the application program, it is compiled. During compilation, the queries in the application program are removed and replaced with calls to routines which are bound to the application program. These routines are optimized machine language procedures produced by compilation of the application program queries by the DBMS compiler.

As a result of instructions to the RDBMS, a materialized view "V" containing the results of a query "Q" might be produced, with changes to the view caused by changes to the underlying base tables R between time $t_0$ and time $t_1$ being recorded in a view delta table $V_{0,1}$ that is generated by a software-implemented propagation module 16. In contrast, a software-implemented apply module 18 applies the view delta table $V_{0,1}$ to the view table V to update, or refresh, the view table V. A tool DPropR currently existing in the assignee's DB2 RDBMS product populates the delta tables from a DBMS transaction log 20. Alternatively, a trigger method can be used, wherein the RDBMS writes changes to a special table as the changes are committed, along with subsequently determined times of the changes.

In accordance with the method described below, the modules 16, 18 can be included in DBMS software contained in an appropriate electronic data storage that includes, e.g., a hard disk drive or optical disk drive that are conventionally coupled to the computer 14. Alternatively, they can be supplied separately from DBMS software on a suitable data storage medium.

Figure 2:
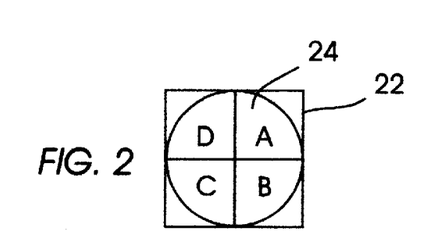
FIG. 2 is a schematic diagram showing an exemplary computer program product.

The flow charts herein illustrate the structure of the logic of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown. For instance, in FIG. 2 a computer program product is shown which includes a floppy disk 22 having a computer usable medium 24 thereon for storing program elements A–D.

In other words, the modules 16, 18 may be a computer program that is executed by a processor within the computer 14 as a series of computer-executable instructions. In addition to the above-mentioned drives, these instructions may reside, for example, in RAM of the computer 14, or the instructions may be stored on a DASD array, magnetic tape, electronic read-only memory, or other appropriate data storage device. In an illustrative embodiment of the invention, the computer-executable instructions may be lines of compiled $C^{++}$ compatible code.

Figure 3:
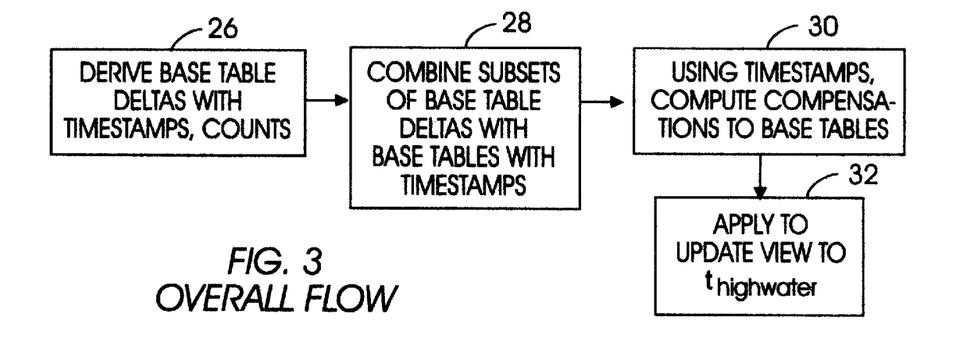
FIG. 3 is a flow chart showing the overall logic.

Now referring to FIG. 2, the overall steps of the present logic can be seen. Commencing at block 26, the base table delta tables $R^i_{a,b}$ for a relation (i.e., a base table) $R^i$ are derived along with their associated tuple timestamps and counts, described above. The notation $R^i_{a,b}$ represents a delta table for base table $R^i$ containing tuples with timestamps after time "a" and up to time "b". Moving to block 28, subsets of the set of base table delta tables are combined, as by joining, with a subset of the base tables according to the select-project-join query of the materialized view using the timestamp information as more fully disclosed below. Then, the combined base and delta tables are added to the view delta table.

Next, using timestamps, compensation tables to the combined base and delta tables can be computed at block 30 and added to the view delta table, as were the combined base and delta tables. Specifically, the present invention permits updating a materialized view by accounting for all transactions that affected base tables of the view that occurred prior to a time $t_{target}$, but with the updating occurring at a time $t_{eval}$ that is later than $t_{target}$, such that the view delta table is rendered asynchronously. When this occurs, the computed combinations of base and delta tables (referred to herein as combination tables) are computed with the intention of capturing view changes up to a time $t_{intended}$. However, the computation of combination tables occurs at a time $t_{eval}$ that is later than $t_{intended}$. Therefore, the combination tables must be compensated for any changes that occur to the base tables between $t_{intended}$ and $t_{eval}$. As set forth further below, this is accomplished by combining compensation tables with combination tables to form a view delta table. The combination tables and compensation tables result in the view delta table $V_A$ (FIG. 1) that records the effects of recent transactions on the materialized view, along with timestamps of the transactions. Accordingly, the materialized view V is updated by the apply module 18 operating on the view delta table $V_A$ using view update processes known in the art at block 32.

Figure 4:
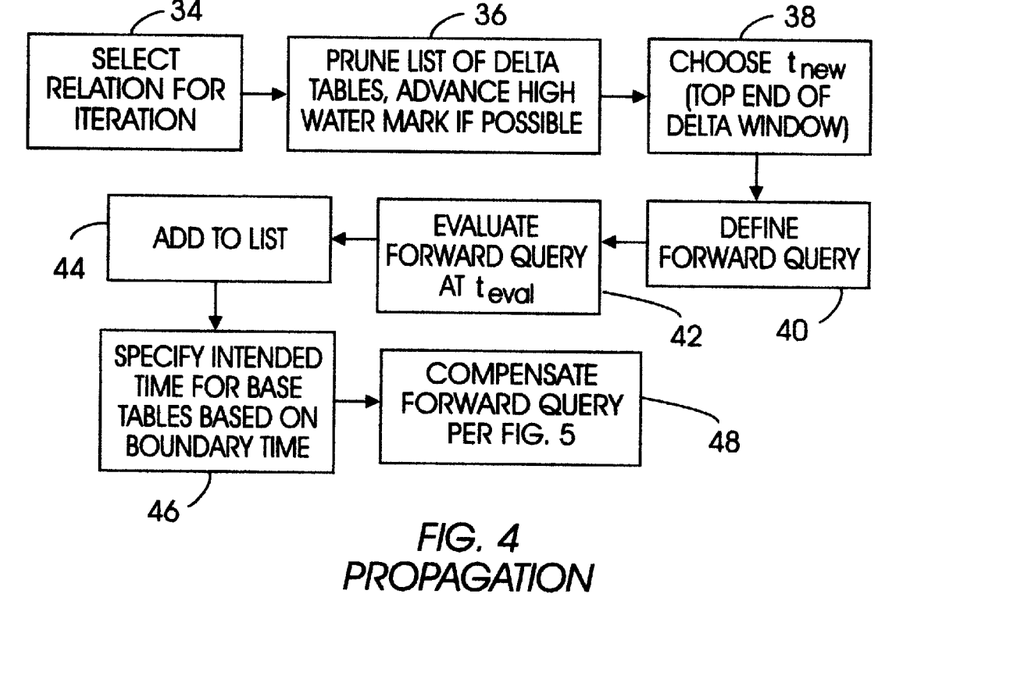
FIG. 4 is a flow chart showing the propagation logic.
Figure 5:
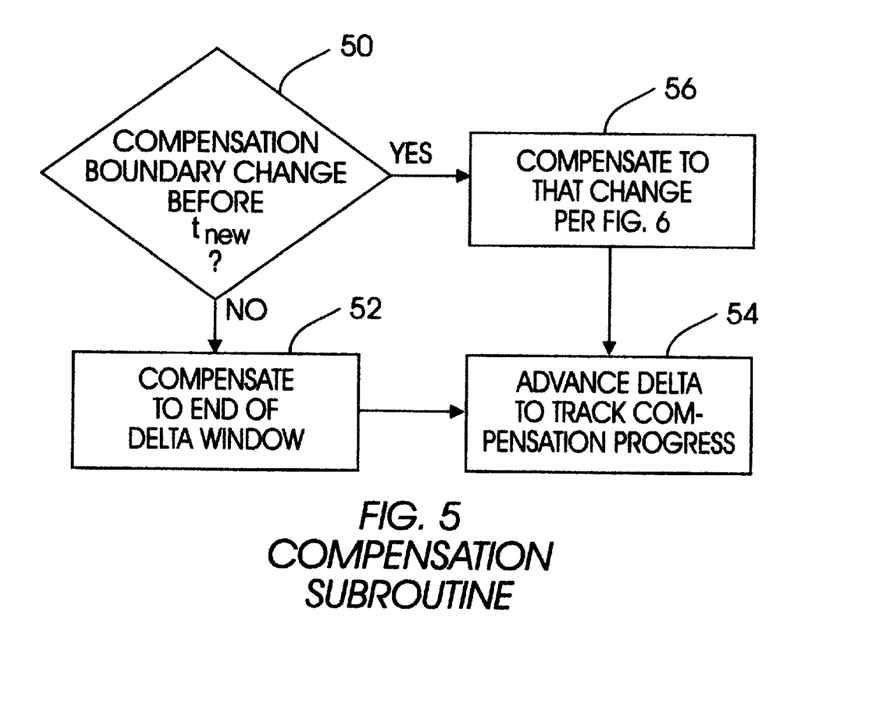
FIG. 5 is a flow chart showing the compensation subroutine of the propagation logic.
Figure 6:
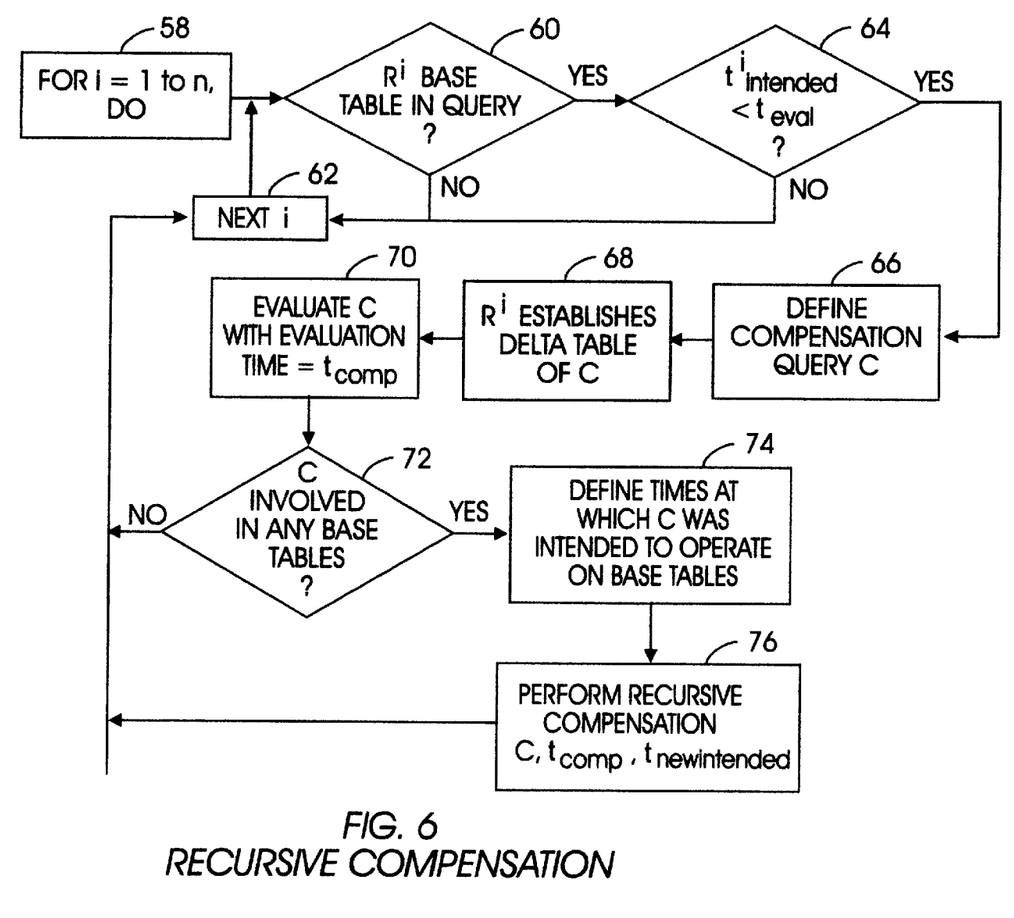
FIG. 6 is a flow chart showing the recursive compensation logic.

FIGS. 4–6 show the details of the overall logic discussed above, as implemented in one preferred embodiment. To understand the following discussion and the accompanying pseudocode, the follow state variables and definitions are defined:

State Variables $t^i_\delta$ current delta time for each table $R^i$ (initially=$t_0$).
$U^i$=list of evaluation times and delta times ($t_{eval}$, $t^i_\delta$) for each forward query for each table $R^i$, in increasing order of evaluation time (initially empty). The list $U^i$ is used for computing compensation boundaries, as more fully disclosed below.

$t^i_{highwater}$=upper time limit imposed by $R^1$'s queries on the view delta "highwater mark". The minimum of the $t^i_{highwater}$s of the tables $R^i$ is the time tc, which it is known that the view delta table accurately describes changes to the materialized view.

Definitions $t^{i,j}_{boundary}=t_\delta$, compensation boundary imposed by $R^j$ on $R^i$ at time $t^i_\delta$, where ($t_{eval}$, $t_\delta$) is the first entry in $U^j$ for which $t_{eval} \geq t^i_{67}$.

$t^{i,j}_{bdry\ change}=t_{eval}$, compensation boundary imposed by $R^j$ on $R^i$ at time $t^i_\delta$, where ($t_{eval}$, $t_\delta$) is the first entry in $U^j$ for whch $t_{eval} \geq t^i_{67}$.

$U^i_{max}=t_{eval}$ the most recent query for $R^i$, where ($t_{eval}$, $t_\delta$) is the last entry in $U^i$.

$t^i_{max}=\min_{j<i}(U^j_{max})$, a predetermined time period from the present beyond which some compensation boundary imposed on $R^i$ will not be defined, wherein $t^i_{max}=\infty$.

In overview, the algorithm discussed below iteratively produces a view table delta from the view's underlying tables and their delta tables. On each iteration, one or more maintenance queries are performed against the underlying base tables and delta tables, with the results being appended to the view delta table. Accordingly, the view delta table consists of timestamped insertion and deletion operations which can be used by the apply module 18 to update the view. On each iteration, the logic performs a single forward query for which a single relation $R^i$ appears as a delta table and all other relations appear as base tables. From the iteration's delta table, the forward query selects those changes that occurred during a time interval referred to below as the "delta window". Each successive delta window for a relation $R^i$ starts where the prior delta window ended, and for each $R^i$ a state variable $t^i_\delta$ is maintained that records the starting position of the delta window for table $R^i$. As provided for herein, the width of the delta window is dynamically selected as appropriate to control the cost of the forward query, depending on resource availability. After the forward query, changes to base tables that occur between the time $t_{eval}$ of the forward query evaluation and the upper limit of the delta window, i.e., $t_{intended}$ of the forward query, are compensated for.

Commencing at block 34 in FIG. 4, a table $R^i$ is selected for the iterative process shown below. The table selected is the table with the smallest index "i" and smallest $t^i_\delta$, i.e., the table with the earliest time for unprocessed changes. Moving to block 36, a list "U" of delta intervals is pruned. and the highwater mark advanced if possible. At any time, the propagated view delta is accurate from $t_0$ up to $t_{highwater}$, such that for all $R^i$ all forward queries up to $t_{highwater}$ have been evaluated and completely compensated for.

Proceeding to block 38, the top end $t_{asw}$ of the delta window is dynamically selected based on, e.g., the availability of system resources. The top end of the delta window defines the size of the window. No delta interval with a delta interval time $t^i_\delta$ less than $t_{highwater}$ appears in the list $U^i$.

Once the delta window is established, the logic moves to block 40 to define a forward query to be $R^i \ldots R^{i-1} R^i_{\delta,new} R^{i-1} \ldots R^n$. Then the forward query is evaluated at block 42 and its evaluation time $t_{eval}$ is determined as described below. A function Evaluate is used to evaluate the forward query and return the time of the transaction in which the forward query is evaluated. The forward query is represented by an n-dimensional vector whose $i^{th}$ element, $Q^i$, is either $R^i$ or $R^i_{a,b}$. The queries themselves have the same form as the view definition, i.e., $(\pi(\sigma(R^1, R^2 \ldots R^n)))$ except for the following changes: if $Q^i=R^i_{a,b}$ then $R^i$ is replaced by the delta table $R^i_{a,b}$ which contains explicit count and timestamp attributes. The count of each tuple in the query result is the product of the counts of the tuples from which it was derived, whereas the timestamp of each tuple is the minimum of the timestamps of the tuples from which it was derived. Note that the minimum of a delta table timestamp and the null timestamp of a base table is the delta table timestamp.

In one embodiment, the transactions time $t_{eval}$, which indicates its position in the serialization order set forth in the list $U^i$, is accomplished by forcing a write of a unique value into a special table, which has an associated delta table. Once the transaction is complete, the logic waits for the special delta table to capture its special table update, from which the logic determines the transaction's identifier and, subsequently, the transaction time. Equivalently, the write to the special table can be identified in the recovery log of the RDBMS.

After forward query evaluation the forward query's delta interval is added to the list $U^i$ at block 44. Then, the intended time for base tables of the forward query is specified at block 46, and any necessary compensations due to the asynchronous refresh logic are performed at block 48 as described further below. The process is then repeated from block 34.

FIG. 5 shows the framework of the compensation subroutine as nested in the pseudocode below. At decision diamond 50, it is essentially determined whether, in the event a compensation is required, the time of the compensation boundary change discussed further below is prior to the top end $t_{new}$ of the delta window. If not, the compensation process is undertaken to the end of the delta window at block 52, and then the delta window is advanced at block 54 to keep track of the progress. Otherwise, the compensation process is executed to the boundary change at block 56.

The above-described logic is further shown in the following pseudocode with comments:

Propagation Algorithm

```
//choose a relation for this iteration
let Rⁱ be the relation with the smallest tⁱ_δ (smallest i in case of a tie)
and let δ be tⁱ_δ
//prune the Uj and advance highwater mark if possible
for each j, let X be all elements (t_eval, t_δ) of Uʲ such that t_eval ≤ tⁱ_δ
    Uʲ ← Uʲ - X
    if X ≠ ∅ then tʲ_highwater ← the largest t_δ in X
//choose t_new defining top end of delta window, tⁱ_δ is bottom
choose any t_new greater than tⁱ_δ and no greater than tⁱ_max
// define the forward query to be R¹ ... Rⁱ⁻¹ R'_δ, new Rⁱ⁻¹ ... Rⁿ
Qⁱ ← Rⁱ_δ, new
∀j ≠ : Qʲ ← Rʲ
// evaluate the forward query
t_eval ← Evaluate (Q)
// add the new query to the list of queries for R'
Uⁱ ← Uⁱ ∪ {(t_eval, tⁱ_δ)}
// specify the intended time for base tables in the forward query
∀j<i: tʲ_intended ← tⁱ, ʲ_boundary
∀j>i: tʲ_intended ← t_eval
// perform any necessary compensation
repeat
    // if there is a compensation boundary change before t_new compensate
    just to that change
    // otherwise, compensate all the way to the end of the delta window
    if min_{j<i} (tⁱ, ʲ_bdrychange) < t_new then t_c ← min_{j<i}(tⁱ, ʲ_bdrychange)
    else t_c ← t_new
    Qⁱ ← Rⁱ_δ, c
    // perform any required compensations
    Compensate (Q, t_eval, t_intended)
```

```
// advance the current delta to track the current progress
tⁱ_δ ← t_c
until tⁱ_δ = t_new
```

Now turning to FIG. 6 to understand the details of the preferred compensation routine Compensate, it is to be first understood that the compensation is recursive when more than two tables are involved in a view, since compensation terms in the view definition equation themselves require compensation. Specifically, when the equation for determining a view delta table ($V_{0,1}$) between the times $t_0$ and $t_1$ for a view V composed of three tables R,S,T is conventionally given in its synchronous form as $$V_{0,1}=R_{0,1}S_1T_1+R_1S_{0,1}T_1+R_1S_1T_{0,1}-R_{0,1}S_{0,1}T_1-R_{0,1}S_1T_{0,1}-R_1S_{0,1}T_{0,1}+R_{0,1}S_{0,1}T_{0,1},$$

then if the first term is to be evaluated asynchronously at a time $t_2$ that is later than $t_1$, the compensation from $t_2$ back to $t_1$ for the first term only is:

$$(R_{0,1}ST)_{1,2}=R_{0,1}S_2T_{1,2}+R_{0,1}S_{1,2}T_2-R_{0,1}S_{1,2}T_{1,2},$$

In the above equation, the present invention recognizes that the first two compensation terms above, i.e., $R_{0,1}S_2T_{1,2}$ and $R_{0,1}S_{1,2}T_2$, require base tables, and can themselves be advantageously moved to later execution times and compensated using the present recursive compensation by rewriting the equation as:

$$(R_{0,1}ST)_{1,2}=R_{0,1}S_3T_{1,2}-R_{0,1}S_{2,3}T_{1,2}+R_{0,1}S_{1,2}T_4-R_{0,1}S_{1,2}T_{2,4}-R_{0,1}S_{1,2}T_{1,2},$$

where the second and fourth terms are compensation for the first and third terms.

Thus, as reflected in the above equations, the delta time windows used for the $R_{0,1}S_1T_1$, $R_1S_{0,1}T_1$, $R_1S_1T_{0,1}$ query can be chosen independently, to take advantage of the fact that different tables that contribute to a join view evolve at different rates.

Every table imposes a compensation boundary on the forward queries of higher-numbered tables, which specifies how far back a table must be compensated to when it appears in a later relation's forward queries. The list $U^i$ mentioned above records the evaluation times and current delta times of forward queries, so that it can be used to determine compensation boundaries as set forth above.

With the above reason for recursive compensation in mind, attention is now directed to FIG. 6, which shows the present recursive compensation method. Commencing at block 58, a DO loop is entered for i=1 to n. At decision diamond 60 it is determined whether the relation under test is a base table in the query. If not, the next "i" is retrieved at block 62, and the logic loops back to decision diamond 60.

When the relation under test is a base table, the logic proceeds to decision diamond 64 to determine whether the intended time of refresh $t^i_{intended}$ is earlier than $t_{eval}$, the evaluation time of the query being compensated. If it is not, indicating that no compensation is required, the process loops back to block 62 to retrieve the next "i". In contrast, when compensation is required the logic proceeds from decision diamond 64 to block 66 to define a compensation query C, which is the same as the query Q being compensated except that the relation $R^i$ under test becomes a delta table over the interval $t^i_{intended}$ to $t_{eval}$.

From block 66 the logic moves to block 68, wherein the relation $R^i$ under test establishes the delta table of the compensation query C. Then, at block 70 the compensation query C is evaluated with an evaluation time of $t_{comp}$. This is done at $t_{comp}$, using the above-described Evaluate algorithm when an odd number of delta tables are used, and otherwise an EvaluateNeg algorithm, which is like Evaluate except that the counts of the deltas are negated before appending them to the view delta.

After compensation query execution, the logic moves to decision diamond 72 to determine whether any base tables were involved in the compensation query. If not, the recursion ends by looping back to block 62 for the next "i". On the other hand, when a base table has been involved, the logic moves to block 74 to define times at which the compensation query was intended to operate on the base tables. Recursive compensation is then performed at block 76 using these times.

The logic above is reflected in the pseudocode below:

```
Compensate (Q, t_eval, t_intended) {
    for each i from 1 to n do {
        // compensate for R^i only if R' appears as a base table in the
        query
        // and only if it was not seen at the intended time
        if (Q^i=R^i) ∧ (t^i_intended < t_eval
            // define C, compensation query
            // C is the same as Q except that R_1 becomes a delta table
            C ← Q;
            // let "intended" = t^i_intended; "eval" = t_eval
            C^i ← R^i_intended, eval
            // evaluate the compensation query at t_comp
            if C has an even number of delta tables
                t_comp ← EvaluateNeg(C)
            else
                t_comp ← Evaluate(C)
            // if C involved in any base tables, perform recursive compensation
            if C has any base tables then
                //define the times at which the compensation query was intended
                to see the base tables
                ∀j<i: if C^j=R^j then t^j_newintended ← t^j_intended
                ∀j>i: if C^j=R^j then t^j_newintended ← t_eval
                // perform recursive compensation
                Compensate (C, t_comp, t_newintended)
```

While the particular SYSTEM AND METHOD FOR ASYNCHRONOUS VIEW MAINTENANCE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover. it is not necessgry for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly, recited using the phrase "means for".

We claim:

1. A computer system, comprising:
    at least one general purpose computer executing method acts to refresh a view table, the method acts comprising:
        deriving changes to at least one base table accessible to the computer to render at least one delta table, the base table being combinable with other tables to render the view table;
        associating at least one record timestamp with at least one record in at least one delta table;
        combining at least one delta table with at least one base table to render a combination table;
        computing at least one combination timestamp representing the combining act;
        using the combination timestamp, computing at least one compensation table; and
        combining at least one compensation table with at least one combination table to render a view delta table useful for refreshing the view table.

2. The system of claim 1, wherein the view table is materialized.

3. The system of claim 2, wherein the act of rendering the view delta table accounts for transactions to a time $t_{target}$, and the rendering of the view delta table is undertaken at a time $t_{eval}$ that is later than $t_{target}$, such that the view delta table is rendered asynchronously.

4. The system of claim 3, wherein the method acts are repeated by the computer, and wherein the combination timestamp is $t_{eval}$ and can be dynamically established during each repetition of the method acts, such that changes to the view are propagated using a series of transactions the sizes of which are established by the selection of $t_{intended}$ for each repetition.

5. The system of claim 4, wherein tuples in the view delta table are timestamped, such that the applying act is undertaken to propagate changes described by view delta table tuples with timestamps up to a time $t_{highwater}$ with validity.

6. The system of claim 2, wherein the act of deriving changes to at least one base table to render at least one delta table accounts for transactions from a time $t_\delta$ prior to the time $t_{intended}$.

7. The system of claim 1, wherein the view table is associated with at least three base tables, and the computer derives changes to the three base tables by accounting for transactions to three respective times $t_{new}^1$, $t_{new}^2$, and $t_{new}^3$, and the times $t_{new}^1$, $t_{new}^2$, and $t_{new}^3$ can be different from each other.

8. The system of claim 1, wherein the act of computing at least one compensation table is undertaken recursively.

9. The system of claim 1, wherein each tuple in a combination table or compensation table is associated with a count, and the count of each tuple is the product of the counts of the tuples from which it was derived.

10. The system of claim 1, wherein each tuple in a combination table or compensation table is associated with a timestamp, and the timestamp of each tuple is the minimum of the timestamps of the tuples from which it was derived.

11. The system of claim 9, wherein the counts of the tuples of a compensation table are conditionally negated before combining the compensation table with the view delta table.

12. The system of claim 1 wherein each combination table and compensation table has a count column and a timestamp column.

13. A computer-implemented method for refreshing a materialized view, comprising the acts of:

evaluating changes for an intended time $t_{intended}$ to at least one base table associated with the view at an evaluation time $t_{eval}$ later than the intended time;

recursively compensating for changes made to at least one base table associated with the view between the intended time $t_{intended}$ and evaluation time $t_{eval}$; and applying the results of the evaluating and compensating acts to the materialized view to refresh the view.

14. The method of claim 13, wherein the view is derived from at least three base tables, and the act of recursively compensating includes compensating a combination table to render a compensation, and then compensating the compensation.

15. The method of claim 14, wherein changes to the three base tables are derived by accounting for transactions to three respective times $t_{new}^1$, $t_{new}^2$, and $t_{new}^3$, and the times $t_{new}^1$, $t_{new}^2$, and $t_{new}^3$ can be different from each other.

16. The method of claim 13, wherein the act of evaluating further comprises:

deriving changes to at least one base table to render at least one delta table, the base table being combinable with other tables to render the view;

associating at least one record timestamp with at least one record in at least one delta table;

combining at least one delta table with at least one base table to render a combination table;

computing at least one combination timestamp representing the combining act;

using the combination timestamp, computing at least one compensation table; and combining at least one compensation table with the combination table to render a view delta table useful for refreshing the view table.

17. The method of claim 16, wherein the act of rendering the delta table accounts for transactions to a time $t_{intended}$, and the rendering of the delta table is undertaken at a time prior to $t_{eval}$ that is later than $t_{intended}$, such that the delta tables are rendered asynchronously.

18. The method of claim 17, wherein $t_{intended}$ can be dynamically established during each of a number of repetitions of the method acts, such that changes to the view are propagated using a series of transactions the sizes of which are established by the selection of $t_{intended}$ for each repetition.

19. The method of claim 18, wherein changes to tuples in the view delta table are timestamped, such that the applying act is undertaken to propagate the changes to a time $t_{highwater}$ with validity.

20. The method of claim 15, wherein the act of deriving changes to at least one base table to render at least one delta table accounts for transactions from a time to prior to the time $t_{intended}$.

21. The method of claim 15, wherein each tuple in a combination table or compensation table is associated with a count, and the count of each tuple is the product of the counts of the tuples from which it was derived.

22. The method of claim 21, wherein the counts of the tuples of a compensation table are conditionally negated before combining the compensation table with the view delta table.

23. The method of claim 16, wherein each tuple in a combination table or compensation table is associated with a timestamp, and the timestamp of each tuple is the minimum of the timestamps of the tuples from which it was derived.

24. A computer program device comprising:

a computer program storage device readable by a digital processing apparatus; and a program on the program storage device and including instructions executable by the digital processing apparatus to incrementally compute changes to a materialized join view which reflect changes to base tables, the program comprising:

computer readable code means for recording updates to a plurality of base tables as they occur;

computer readable code means for, at subsequent times, extracting the updates that occurred to selected base tables over given time intervals;

computer readable code means for combining extracted updates with the base tables in multiple steps to compute changes to the materialized join view;

wherein the means for combining includes:

computer readable code means for evaluating changes for an intended time $t_{intended}$ to at least one base table associated with the view at an evaluation time $t_{eval}$ later than the intended time;

computer readable code means for recursively compensating for changes made to the base table between the intended time $t_{intended}$ and evaluation time $t_{eval}$; and computer readable code means for applying the results of the evaluating and compensating means to the materialized view to refresh the view.

25. The device of claim 24, wherein the view is derived from at least three base tables, and the means for recursively compensating includes means for compensating at least one base table to render a compensation, and then compensating the compensation.

26. The device of claim 25, wherein means for evaluating further comprises:

computer readable code means for deriving changes to at least one base table to render at least one delta table, the base table being combinable with other tables to render the view;

computer readable code means for associating at least one record timestamp with at least one record in at least one delta table;

computer readable code means for combining at least one delta table with at least one base table to render a combination table;

computer readable code means for computing at least one combination timestamp;

computer readable code means for using the combination timestamp to compute at least one compensation table; and computer readable code means for applying at least one compensation table and at least one combination table to render a view delta table useful for refreshing the view.

27. The device of claim 26, wherein the means for rendering the delta table accounts for transactions to a time $t_{intended}$, and the rendering of the delta table is undertaken prior to a time $t_{eval}$ that is later than $t_{intended}$, such that the delta tables are rendered asynchronously.

28. The device of claim 27, wherein $t_{intended}$ can be dynamically established during each of a number of repetitions, such that changes to the view are propagated using a series of transactions the sizes of which are established by the selection of $t_{intended}$ for each repetition.

29. The device of claim 26, wherein each tuple in a combination table or compensation table is associated with a count and a timestamp, and the count of each tuple is the product of the counts of the tuples from which it was derived and the timestamp of each tuple is the minimum of the timestamps of the tuples from which it was derived.

30. The device of claim 29, further comprising computer readable code means for selectively negating the counts of the tuples of a compensation table before combining the compensation table with the view delta table.

* * * * *